United States Patent Office 3,446,066
Patented May 27, 1969

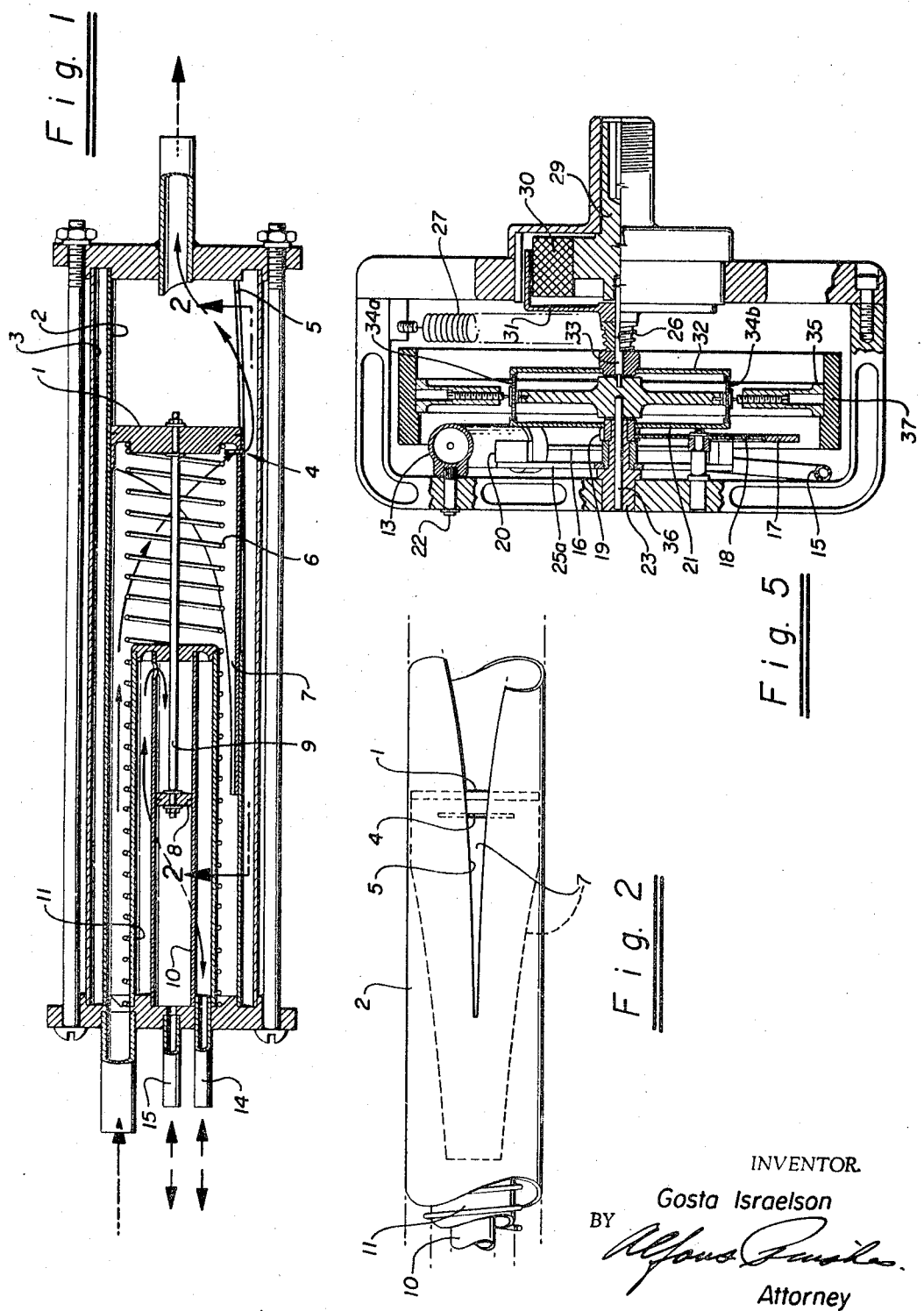

3,446,066
GASOLINE MILEAGE GAGE
Gosta Israelson, 17 El Monte Lane,
Sausalito, Calif. 94965
Filed Mar. 28, 1967, Ser. No. 626,486
Int. Cl. G01l 3/26
U.S. Cl. 73—114                                 3 Claims

ABSTRACT OF THE DISCLOSURE

My invention relates to an apparatus which instantaneously indicates the rate of consumption of gasoline in miles per gallon of a motor vehicle while the latter is in normal operation. More specifically it relates to a gasoline mileage gage which will simply and accurately indicate the mileage being obtained by a given vehicle on a conveniently read scale.

Background summary of the invention

As is well known to those skilled in the art, the rate of gasoline or other fuel consumption of an internal combustion engine is not only of considerable importance to the operator from the standpoint of economical operation of the vehicle, but is also an important indication of the mechanical condition of the vehicle and especially of the thermodynamic efficiency of the engine at the time. This is not only important from the standpoint of economical operation, but also from the standpoint of proper maintenance of the vehicle and the engine. It has more recently become of greater importance because of the urgency of smog prevention which in turn is closely associated with efficient operation of the engine.

Numerous devices purporting to effect this result have been built, but these are all accompanied by many disadvantages. The principal ones have been complexity of the mechanism, inaccuracy of the readings, cumbersomeness of the scales used, and general unreliability.

Summary of the invention

It is therefore a principal object of my invention to provide a gage for instantaneously recording the fuel consumption of an internal combustion engine which would be more simple and reliable than any others heretofore constructed.

It is another object of my invention to provide a gage of the class described herein which would have an easy reading scale.

It is still another object of my invention to provide a gage of the class described which would be more accurate than any other heretofore constructed.

It is finally an object of my invention to provide a gage of the class described which would be readily adaptable to a wide range of different internal combustion engines.

I have discovered that by utilizing the special sensing mechanism and an orifice of my invention combined with the special speed unit, I am able to achieve all of the above and many other advantages which will become evident to those skilled in the art from the description which follows, including the accompanying figures.

Description of the drawings

FIG. 1 is a longitudinal section through a simple embodiment of the flow sensing component of my invention.

FIG. 2 is a partial section along the lines 2—2 of FIG. 1.

FIG. 5 is a cross section through the entire indicating unit component of my invention.

Description of the preferred embodiments

Figure 6:
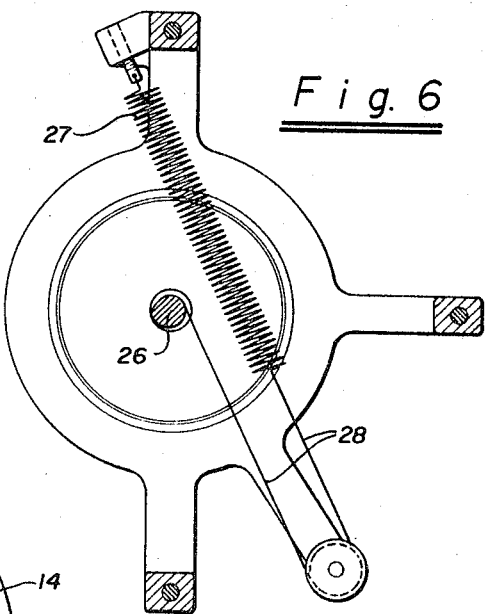
FIG. 6 is a diagrammatic view showing the method of operation of the spiral groove and spring combination within the sensing device.

My invention consists of two major parts or units: the gasoline flow sensing device A, FIG. 1; and the indicating unit with the integrator and the speed sensing device which form a part of the indicating unit B, FIG. 5 and FIG. 6. These are described more fully below.

The purpose of the gasoline flow sensing device is to translate the flow of gasoline in the line from the gas tank to the carburetor (engine) into a mechanical motion which can be made to actuate one-half of the integrator. The device consists of a piston 1 which moves in a cylinder 2 which in turn is enclosed in an outer cylinder 3. The piston 1 is provided with a slot 4 which moves inside an aperture 5 in cylinder 2. Aperture 5 has been given a specific logarithmic shape such that the resultant orifice obtained by the combination of slot 4 and aperture 5 will produce a logarithmic motion of piston 1 as a function of the amount of gasoline flowing through the device. With the flow sensing device inserted in the line between the fuel pump and the carburetor the device will produce a certain resistance to any flow through it. This will appear as a pressure difference across piston 1. The movement of piston 1 from left to right is counteracted by a tension coil spring 6. With no gasoline flowing through the line (carburetor needle valve closed), coil spring 6 holds piston 1 in its extreme left position. Slot 4 is them at the narrow end of aperture 5 and practically closing completely. However, a minute opening is still provided to permit complete equalization of the pressure on both sides of piston 1. When the needle valve in the carburetor opens, the pressure on the right side of the piston drops immediately causing the piston to move. The piston will stop in a position I where the pressure difference across it, in combination with the resultant opening of slot 4 and aperture 5, produces a flow equaling that through the carburetor needle valve. With the needle valve opening still further the piston will sense an increased pressure difference causing it to move to a new position II providing a large opening through 4 and 5 which together with the higher pressure difference will result in an increased gasoline flow corresponding to the new demand by the carburetor. The displacement L of the piston may be expressed as:

$$L = E (\log Q_{II} - \log Q_I)$$

where:

E = Scale modulus
$Q_{II}$ and $Q_I$ = New and old flows, respectively.

It should be mentioned here that piston 1 obviously closes tightly against cylinder 2 so that the only passage for the gasoline entering cylinder 2 from the left is through orifices 4 and 5 into outer cylinder 3 and back through the extension of aperture 5 to the right of the piston, and out through the center opening at the right. A tail-like extension 7 of piston 1 is provided to cover aperture 5 behind the piston when the piston is in a forward position.

The logarithmic movement of piston 1 is hydraulically transferred to the integrating instrument by means of piston 8 which is mechanically connected to piston 1 through rod 9. The hydraulic system consists of the primary piston 8 in cylinder 10 and the secondary piston 12 in cylinder 13, seen on FIG. 3. The two cylinders are connected together through lines 14 and 15, seen on FIG. 4, providing a double action pressure-vacuum system to insure a more positive and faithful interaction between the two pistons, and also eliminates the need for a return spring at piston 12.

Figure 3:
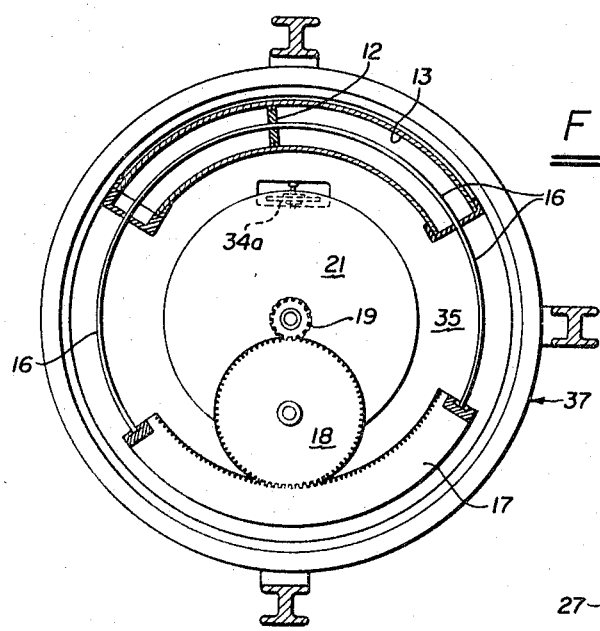
FIG. 3 is a diagrammatic section through one part of the indicating unit of my invention showing the principle of operation of the mechanism of FIG. 4.
Figure 4:
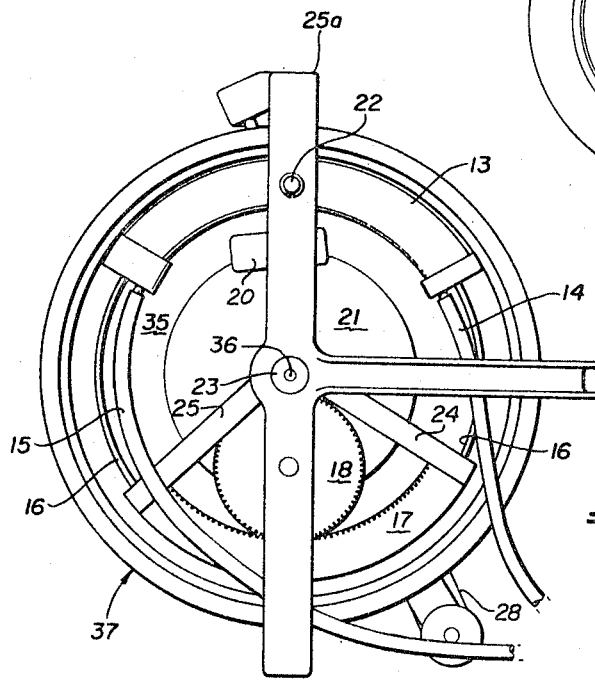
FIG. 4 is an end view of the mechanism within the indicating unit showing the method by which flow measurement sensing is transmitted to the indicating mechanism.

The movement of piston 12 is transferred to gear 21, seen on FIG. 5, through connecting rod 16, curved rack 17, idler 18, and pinion 19 which serves as a hub for gear 21, seen on FIG. 3, FIG. 4, and FIG. 5.

Cylinder 13 is mounted on a pivot 22 to allow for any misalignment with connecting rod 16 and rack 17, best seen on FIG. 4.

Rack 17 is mounted on spokes 24 and 25 which are pivoted on bushing 23. The whole rotating assembly comprising piston 12, connecting rod 16, rack 17, and spokes 24 and 25 is counterbalanced by a weight 20 which is mounted on an extension of spokes 24 and 25, namely 25a, thus relieving piston 12 of external forces.

The sensing device, FIG. 5 consists of a magnetic clutch assembly of conventional design, more fully described below, and a logarithmic spiral groove 26, tension coil spring 27 with a flexible thread 28. This may also be seen on FIG. 6. The magnetic clutch is composed of a drive shaft 29 on which is mounted a circular magnet 30 which rotates within a metallic drum 31. Drive shaft 29 is driven by a "tap" from the speedometer cable to rotate at a speed directly proportional to the speed of the car. The magnetic coupling between magnet 30 and drum 31 is directly proportional to the speed of magnet 30 and consequently the torque exerted on drum 31 is directly proportional to the speed of the car. Drum 31, the logarithmic spiral groove 26 and gear 32 are fixedly mounted on a common shaft 33. The rotation of 26, 31, 32, and 33 is counteracted by spring 27 as follows: when the assembly 26, 31, 32, and 33 is brought to rotate in the counterclockwise direction, as seen on FIG. 6, the thread 28 will wind itself around the logarithmic spiral 26, thus stretching spring 27. As the tension in an extension coil spring is directly proportional to its elongation, and since it is desired to obtain a logarithmic rotation of gear 32, the shape of the logarithmic groove 26 is designed such that the length of thread wound in the groove from the point of origin to a specific point of rotation, corresponding to a specific elongation, and consequently tension in the spring, times the radius of the curve at this point, will produce a torque equalling that of the magnetic clutch for a predetermined speed of the car.

By proper selection of physical dimensions such as the length of the stroke of piston 1, the gear ratio of rack 17 and gear 19, the stiffness of spring 27, etc., identical angular displacement or scale moduli can be obtained for gears 21 and 32 in terms of gallons per hour and miles per hour respectively. Gears 21 and 32 are part of the differential gear assembly 21, 32, 34a, 34b. Wheel 35 is actuated by gears 21 and 32 through the planetary gears 34a and 34b.

By making gears 21 and 32 revolve in opposition to each other for an increase in the registered values, gallons per hour and miles per hour respectively, the resultant movement of wheel 35 will represent the difference of the angular displacement of 21 and 32. Since the rotation of gears 21 and 32 is proportional to the logarithm of the values registered, wheel 35 will actually register $$\log(\text{m.p.h.}) - \log(\text{gal. p.h.})$$

which mathematically means $$\frac{\frac{\text{miles}}{\text{hour}}}{\frac{\text{gallons}}{\text{hour}}} = \text{miles/gallon}$$

Drum 37, which is mounted on wheel 35, can then be graduated with a direct reading scale to actually register this ratio.

It may be further noted that since wheel 35 is fixedly mounted on shaft 36 the instrument can easily be modified from a drum indicating instrument by simply extending shaft 36 to project far enough beyond bushing 23 to allow for mounting of a dial and indicating hand.

Figure 7:
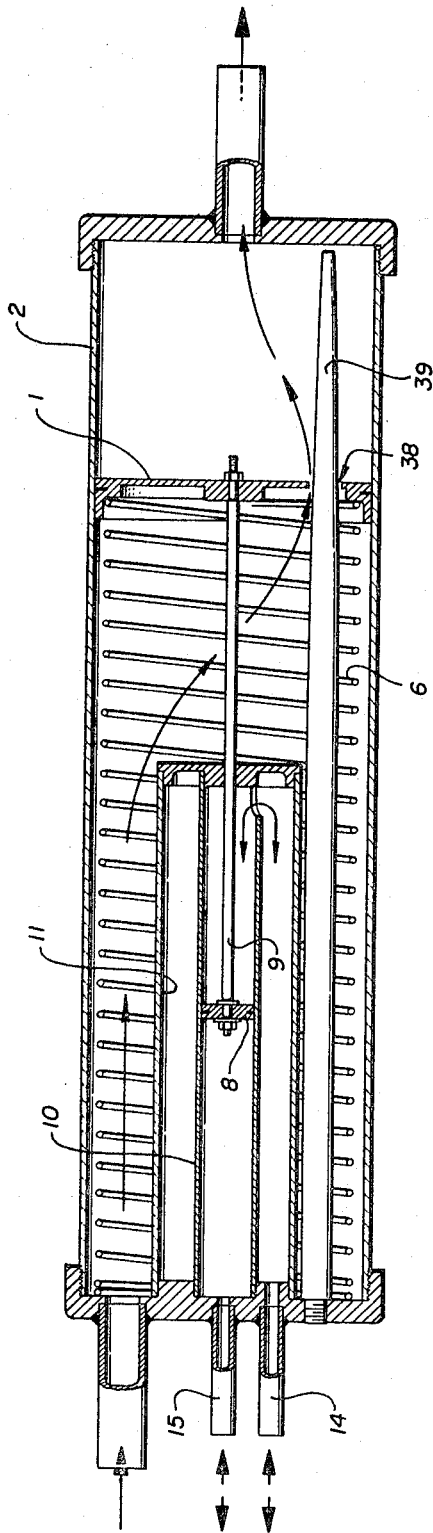
FIG. 7 is an alternate embodiment of the device of FIG. 1.

The operation of the alternate embodiment of my device seen on FIG. 7 is similar to that of FIG. 1. The principal difference is that slot 4 and aperture 5 of FIG. 1 are replaced by orifice 38 and stationary needle 39 respectively. Piston 1, having the same function as in the device of FIG. 1, will move toward the right as the demand in the amount of flow increases. This results in an increase in the size of opening 38 allowing a larger amount of liquid to pass through the device. The outer surface of needle 39 has been given a special logarithmic shape so that in co-acting with orifice 38 the same effect is produced as the co-action of slot 4 and aperture 5 of FIG. 1 described above.

This embodiment is easier to construct in some materials, more rugged in construction, less likely to clog and in general gives greater reliability of operation, especially with more viscous fuels.

While I have described preferred embodiments of a device particularly adapted to gasoline, other devices will now be evident to those skilled in the art as well as applications to other fuels. I therefore do not limit myself to the embodiments disclosed herein except as I do so in the claims which follow.

I claim:

1. A device for instantaneously indicating the rate of consumption of liquid by the engine of a motor vehicle comprising the combination:
   a fuel flow sensing unit comprising,
      a cylinder and piston means disposed to be displaced in proportion to the logarithm of the rate of flow of said fuel through said cylinder in gallons per minute;
      means for transmitting said displacement to a first rotating pinion;
   a speed unit comprising,
      speedometer means disposed to cause rotation of a cable in proportion to the logarithm of the velocity of said vehicle in miles per hour;
      means for transmitting said rotation to a second rotating pinion;
   an integrating and indicating unit comprising,
      a planetary gear engaging simultaneously said first and said second rotating pinion on diametrically opposite sides of said gear;
      a graduated scale positioned upon and disposed to move with the planetary motion of said planetary gear.

2. A device for instantaneously indicating the rate of consumption of liquid fuel by the engine of a motor vehicle comprising the combination of a fuel flow sensing unit, a speed sensing unit and an integrating and indicating unit in which:
   said fuel flow sensing unit comprises,
      a piston slideably mounted in a cylinder;
      means for introducing the flow of fluid to be measured to the first face of said piston;
      a compression spring operably engaging the opposite face of said piston;
      a slot through the wall of said piston communicating with said first face;
      an aperture of varying cross-section through the wall of said cylinder along the path of travel of said piston communicating with said slot in said piston said slot extending across opposite sides of said aperture and defining an orifice for the flow of said fluid, thereby causing displacement of said piston;
      means for measuring the amount of displacement of said piston,
      said aperture and said orifice being so disposed that said displacement is proportional to the logarithm of the rate of flow of said fuel;

said speed sensing unit comprises,
- a flexible cable having its first end coupled to a rotating member of said vehicle and disposed to rotate at a velocity proportional to the velocity of said vehicle in miles per hour;
- a magnetic clutch comprising a driver member and a following member;
- said cable having its second end coupled to said driver member;
- a cylindrical drum fixedly positioned on the concentric axis of said follower member;
- said drum being characterized by a logarithmic spiro-helical groove on its outer cylindrical surface;
- a stringlike member having its first end fixed to one end of said logarithmic groove and its second end engaging a spring means whereby the torque transmitted by said follower member is proportional to the logarithm of the velocity of said vehicle;

said integrating and indicating unit comprises,
- means for conveying said displacement of said piston to rotary motion;
- a first pinion in rotating relation with said converting means;
- a second pinion fixedly positioned on said cylindrical drum and follower member;
- a planetary gear simultaneously engaging said first pinion at one point and said second pinion at a diametrically opposite point;
- a scale fixedly positioned upon and disposed to travel with the planetary motion of said planetary gear;
- said scale being graduated to read directly in miles per gallon.

3. In a device for instantaneously indicating the rate of consumption of liquid fuel by the engine of a motor vehicle the improved means for measuring the rate of flow of said fuel comprising:
- a piston slideably mounted in a cylinder;
- means for introducing the flow of fluid to be measured to the first face of said piston;
- a compression spring operably engaging the opposite face of said piston;
- a slot through the wall of said piston communicating with said first face;
- an aperture of varying cross-section through the wall of said cylinder along the path of travel of said piston communicating with said slot in said piston, said slot extending across opposite sides of said aperture and defining an orifice for the flow of said fluid, thereby causing displacement of said piston;
- a second piston slideably mounted in a second cylinder;
- said second piston and cylinder positioned in axial spaced relation to said first piston;
- a piston rod engaging said first piston, said second piston and said compression spring;
- a fluid disposed within said second cylinder;
- means for communicating said fluid to an indicating device.

References Cited
UNITED STATES PATENTS

| | | | |
|---|---|---|---|
| 1,641,744 | 9/1927 | Decker | 73—208 |
| 2,052,022 | 8/1936 | Fisher | 73—208 |
| 2,701,097 | 2/1955 | Strong | 73—114 X |
| 3,218,853 | 11/1965 | Ongaro | 73—208 |
| 3,259,310 | 7/1966 | Rochfort | 73—114 X |

RICHARD C. QUEISSER, *Primary Examiner.*

J. W. MYRACLE, *Assistant Examiner.*

U.S. Cl. X.R.

73—208, 210